Oct. 13, 1936.  J. F. PROSPERO  2,057,445
TIRE DEFLATION SWITCH
Filed Nov. 14, 1935
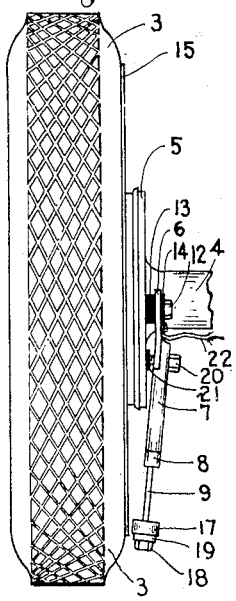
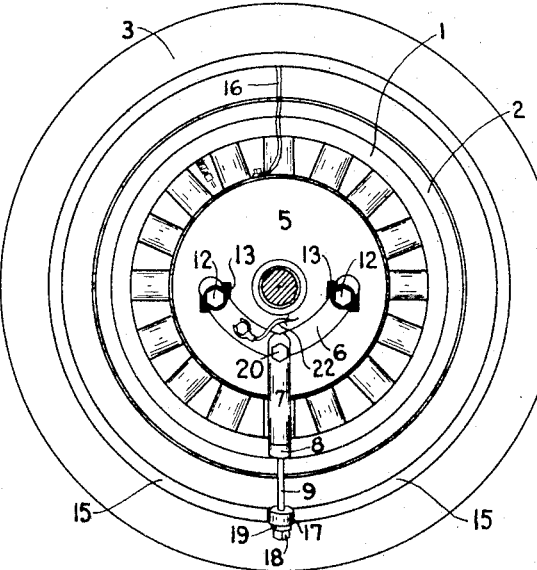
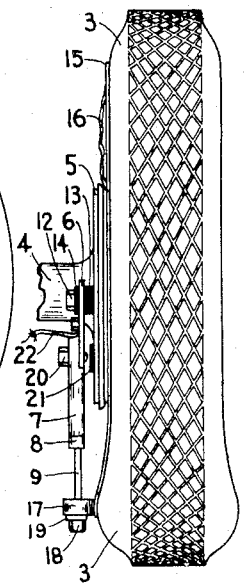
INVENTOR
Joseph F. Prospero
BY
Francis E. Boyce
ATTORNEY Patented Oct. 13, 1936

2,057,445

UNITED STATES PATENT OFFICE 2,057,445

TIRE DEFLATION SWITCH

Joseph F. Prospero, Jersey City, N. J.

Application November 14, 1935, Serial No. 49,665

3 Claims. (Cl. 200—58)

This invention relates to a safety device for vehicles having pneumatic tires, the principal object of the invention being to provide an efficient device which I have termed herein a deflation switch by means of which deflation of the tires will be automatically indicated to the driver of the vehicle thereby warning him of the danger of a possible blow-out, and which device is simple in construction and economical to manufacture and install.

Other objects and advantages of the invention will appear as the description proceeds.

In the drawing accompanying this specification,

Fig. 1 is a side view of an automobile wheel provided with a safety deflation switch embodying the features of the present invention;

Fig. 2 is an edge view of the wheel showing the switch in normally open position;

Fig. 3 is a view similar to Fig. 2, but showing the switch closed;

Fig. 4 is a longitudinal sectional view, on an enlarged scale, through one member of the safety switch; and Fig. 5 is an enlarged transverse sectional view of the ball-bearing contact roller carried by the switch member shown in Fig. 4.

As is well known to motorists, blow-outs quite frequently occur as the result of slow leaks of air which, although not noticeable when the vehicle is at rest, become more active when traveling, at which time there is of course no opportunity to observe the tires. Consequently, especially on a long journey, the occupants of a vehicle having pneumatic tires are exposed to the danger of a blow-out which could easily be avoided if the operator could in some way be warned of the deflation of the tire which usually precedes such a blow-out. It is the object of this invention to provide a means for giving such a warning in good time to enable the operator to bring the vehicle to a stop and take measures to stop the leak and thereby avoid the danger incident to a blow-out.

Referring to the drawing, 1 designates an automobile wheel, which may be of the disk, wire or wood type, said wheel having the usual metal rim 2 in which is mounted the pneumatic tire 3. The axle housing of the vehicle is indicated at 4, while 5 indicates the usual backing plate or flange carried at the opposite ends of said axle housing.

A complete safety signaling switch such as that about to be described is provided for each wheel, and since they are all alike a description of one will suffice.

The safety switch comprises a yoke member or bracket 6 made integral with or rigidly secured to a cylindrical member or sleeve 7. A cap 8 is threaded on the outer end of the sleeve and is provided in its end wall with an opening through which passes a plunger rod 9 carrying at its inner end a piston 10 adapted for reciprocation within the cylinder 7 against the tension of a spring 11 disposed in the cylinder, as clearly shown in Fig. 4.

The assembly so far described and which forms one member of the safety switch, is secured on the backing plate 5 by means of bolts 12 passing through the legs of the yoke 6 and threaded into the backing plate, an insulating member 13 being disposed between the backing plate and each leg of the yoke, the bolts 12 being also insulated from the yoke by insulating washers 14. With the device thus mounted, the cylinder 7 extends radially of the wheel and directly downward.

For cooperation with the switch member above described, a flexible copper ring or band 15 is vulcanized to the side of the tire casing or shoe in concentric relation to the tread of the tire, said band having a radial wire 16 extending into contact with a metal portion of the wheel. In case a wooden wheel is used the wire will extend down to a point of the wheel, preferably the hub, which contacts with the backing plate 5, as shown in the drawing to provide for "grounding". Near the outer end of the plunger rod 9 is mounted a ball-bearing roller 17, said roller being retained on the rod by a nut 18, and washer 19, the nut being threaded on the extreme end of the rod as shown in Fig. 4. The length of the rod is such that when projected out to its extreme position under the tension of the spring 7 the roller 17 will lie in the same horizontal plane as the ring 15 secured on the tire casing.

The yoke 6 is sufficiently flexible to permit a slight adjustment of the cylinder 7 so as to increase or diminish the distance between the roller 17 and the ring 15 on the tire. For accomplishing this adjustment, a screw 20 is threaded through the cylinder at its point of juncture with the yoke 6, the inner end of said screw bearing upon an insulating washer or block 21 secured on the backing plate 5. It will thus be seen that by turning the screw 20 in one direction or the other the distance between the roller 17 and ring 15 can readily be regulated.

The yoke 6 has secured thereto a lead wire 22 the opposite end of which is intended to be connected to one pole of the car battery.

With a safety switch device as above described mounted on each of the four wheels, the cylinder 7 of each device is adjusted so that when the tire is inflated to its normal capacity the contact roller 17 is separated from the ring 15, as shown in Fig. 2. A suitable electrically operated indicator may be mounted on the dash board of the vehicle and connected by separate circuits to the devices of the individual wheels, so that should either of the tires develop a leak the resulting deformation or flattening of the tire under the weight of the vehicle carrying the ring 15 into contact with the roller 17, as shown in Fig. 3, the circuit through the individual signalling device for that wheel will be closed so that the operator is immediately warned of the threatened danger of a blow-out.

Having thus described my invention, what I claim is:

1. A deflation switch for pneumatic tires, comprising a contact member disposed at one side of the tire and normally out of contact therewith, and an annular contact member carried by the tire at the side thereof adjacent to said first contact member and in position to be moved by deflation of the tire into contact with said first contact member thereby to close an electrical circuit.

2. A deflation switch for pneumatic tires, comprising a contact member disposed at one side of the tire and normally out of contact therewith, an annular contact member carried by the tire at the side thereof adjacent to said first contact member and in position to be moved by deflation of the tire into contact with said first contact member thereby to close an electrical circuit, and means for regulating the distance between said contact members.

3. A deflation switch for pneumatic tires, comprising a contact roller disposed at one side of the tire and normally out of contact therewith, said roller being mounted for rotation in a direction at right angles to the direction of travel of the tire, and a flexible annular contact member carried by the tire at the side thereof adjacent to said contact roller in position to be flexed by deflation of the tire into contact with said roller.

JOSEPH F. PROSPERO.